United States Patent
Hotta (10) Patent No.: US 10,408,141 B2
(45) Date of Patent: Sep. 10, 2019

(54) LEAN-BURN ENGINE

(71) Applicant: TOYOTA JIDOSHA KABUSHIKI KAISHA, Toyota-shi, Aichi-ken (JP)

(72) Inventor: Shintaro Hotta, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 99 days.

(21) Appl. No.: 15/534,209

(22) PCT Filed: Nov. 26, 2015

(86) PCT No.: PCT/JP2015/005872
§ 371 (c)(1),
(2) Date: Jun. 8, 2017

(87) PCT Pub. No.: WO2016/120926
PCT Pub. Date: Aug. 4, 2016

(65) Prior Publication Data
US 2017/0335779 A1    Nov. 23, 2017

(30) Foreign Application Priority Data

Jan. 26, 2015   (JP) .................................. 2015-012613

(51) Int. Cl.
*F02D 23/00*     (2006.01)
*F01L 1/047*     (2006.01)
(Continued)

(52) U.S. Cl.
CPC .......... *F02D 41/0007* (2013.01); *F01L 1/047* (2013.01); *F01L 1/34413* (2013.01);
(Continued)

(58) Field of Classification Search
CPC .. F02D 13/0257; F02D 23/00; F02D 41/3094; F02D 2200/0406; F02P 5/145; Y02T 10/144; Y02T 10/18
(Continued)

(56) References Cited

U.S. PATENT DOCUMENTS

| 6,574,961 B2* | 6/2003 | Shiraishi | F02D 13/0215 60/611 |
| 7,021,277 B2* | 4/2006 | Kuo | F02D 13/0215 123/90.15 |

(Continued)

FOREIGN PATENT DOCUMENTS

| JP | 2000-345889 A | 12/2000 |
| JP | 2004-183510 A | 7/2004 |
| JP | 2010084532 A | * 4/2010 |
| JP | 2013124657 A | * 6/2013 |

*Primary Examiner* — Thai Ba Trieu
(74) *Attorney, Agent, or Firm* — Hunton Andrews Kurth LLP (57) ABSTRACT

In a lean-burn engine equipped with a turbocharger, a responsiveness of a supercharging pressure in a lean region is enhanced by control of a valve timing of an exhaust valve while a combustion state is restrained from varying. A variable valve mechanism that can change an opening timing of the exhaust valve while keeping a closing timing of the exhaust valve constant, is included in the lean-burn engine. When a target operation point is located in the lean region, and when an actual supercharging pressure is lower than a target supercharging pressure, supercharging pressure increasing control that advances the opening timing while keeping the closing timing constant is executed by operating the variable valve mechanism.

8 Claims, 9 Drawing Sheets

(51) Int. Cl.
*F01L 1/344* (2006.01)
*F02D 41/00* (2006.01)
*F02D 41/10* (2006.01)
*F02D 41/30* (2006.01)
*F02D 13/02* (2006.01)
*F02D 41/02* (2006.01)
*F02P 5/145* (2006.01)
*F01L 13/00* (2006.01)
*F01L 1/053* (2006.01)

(52) U.S. Cl.
CPC ..... *F02D 13/0215* (2013.01); *F02D 13/0249* (2013.01); *F02D 13/0257* (2013.01); *F02D 23/00* (2013.01); *F02D 41/0235* (2013.01); *F02D 41/10* (2013.01); *F02D 41/3029* (2013.01); *F02D 41/3064* (2013.01); *F02D 41/3094* (2013.01); *F02P 5/145* (2013.01); *F01L 13/0036* (2013.01); *F01L 2001/0537* (2013.01); *F02D 2041/001* (2013.01); *F02D 2041/0265* (2013.01); *F02D 2200/0406* (2013.01); *Y02T 10/144* (2013.01); *Y02T 10/18* (2013.01)

(58) Field of Classification Search
USPC ...................... 60/602–603; 123/90.15, 90.17
See application file for complete search history.

(56) References Cited

U.S. PATENT DOCUMENTS

| | | | | |
|---|---|---|---|---|
| 7,032,381 B2* | 4/2006 | Shiraishi | ............. | F02D 13/0215 60/611 |
| 7,128,047 B2* | 10/2006 | Kuo | .................... | F02D 13/0215 123/299 |
| 7,228,839 B2* | 6/2007 | Kuo | .................... | F02D 13/0215 123/90.15 |
| 7,415,966 B2* | 8/2008 | Irisawa | ............... | F02D 41/0007 123/326 |
| 7,707,988 B2* | 5/2010 | Irisawa | ............... | F02D 41/0007 123/299 |
| 7,740,010 B2* | 6/2010 | Fulton | ................ | F02D 41/0047 701/108 |
| 2005/0268886 A1* | 12/2005 | Etou | ................... | F02D 41/0025 123/406.29 |
| 2007/0142937 A1* | 6/2007 | Yasui | ................. | F02D 41/1402 700/29 |
| 2007/0255487 A1* | 11/2007 | Etou | ................... | F02D 41/0025 701/105 |
| 2007/0270983 A1* | 11/2007 | Yasui | ................. | F02D 41/1402 700/31 |
| 2009/0277434 A1* | 11/2009 | Surnilla | ............. | F01L 13/0036 123/90.15 |
| 2012/0167841 A1* | 7/2012 | Surnilla | ............. | F01L 13/0036 123/90.15 |
| 2017/0074204 A1* | 3/2017 | Takamiya | ............... | F02D 23/02 |

* cited by examiner

LEAN-BURN ENGINE

CROSS-REFERENCE TO RELATED APPLICATIONS

This is a national phase application based on the PCT International Patent Application No. PCT/JP2015/005872 filed Nov. 26, 2015, claiming priority to Japanese Patent Application No. 2015-012613 filed Jan. 26, 2015, the entire contents of both of which are incorporated herein by reference.

FIELD

The present application relates to a lean-burn engine, and more particularly to the lean-burn engine equipped with a turbocharger.

BACKGROUND

PTL 1 as follows discloses enhancing a response of a turbocharger by increasing exhaust blowdown energy by advancing an opening timing of an exhaust valve by a variable valve timing mechanism at an acceleration transition time in a low-to-medium speed region and a low load region in an engine equipped with the turbocharger.

CITATION LIST

Patent Literature

PTL 1: Japanese Patent Laid-Open No. 2004-183510
PTL 2: Japanese Patent Laid-Open No. 2000-345889

SUMMARY

Technical Problem

Enhancing the response of the turbocharger is a problem that also applies to a lean-burn engine. Consequently, the method of the above described prior art that increases the exhaust blowdown energy by advancing the opening timing of the exhaust valve is one of the methods that are desired to be applied to the lean-burn engine.

However, combustion with a lean air-fuel ratio that is leaner than a theoretical air-fuel ratio, which is a characteristic of the lean-burn engine is lower in robustness as compared with combustion with the theoretical air-fuel ratio. Therefore, when any one of parameters relating to the combustion is changed, complicated control is required in order to keep a combustion state constant. In a case of the above described prior art, when the opening timing of the exhaust valve is advanced by the variable valve timing mechanism, a closing timing of the exhaust valve is also advanced simultaneously with this. As a result, a valve overlap period of the intake valve and the exhaust valve changes. The valve overlap period is an important parameter that influences an intake air amount and an EGR rate. Therefore, if the valve overlap period changes, it becomes difficult to keep the combustion state constant, and there arises a fear of causing a variation of the combustion state.

The present application is made in the light of the problem as described above, and has an object to enable a responsiveness of a supercharging pressure in a lean region to be enhanced by control of a valve timing of an exhaust valve while restraining a combustion state from varying in a lean-burn engine equipped with a turbocharger.

Solution to Problem

A lean-burn engine according to the present application is a lean-burn engine equipped with a turbocharger, and includes a variable valve mechanism capable of changing an opening timing of an exhaust valve while keeping a closing timing of the exhaust valve constant. The variable valve mechanism includes at least two cams that differ in an angle of a lift start position with respect to a reference position of a camshaft but are the same in an angle of a lift end position, and is configured to switch the at least the two cams. Further, the lean-burn engine according to the present application includes a control device that executes supercharging pressure increasing control. The supercharging pressure increasing control is control that advances the opening timing while keeping the closing timing constant by operating the variable valve mechanism, when a target operation point of the lean-burn engine is located in a lean region in which an operation with a lean air-fuel ratio that is leaner than a theoretical air-fuel ratio is selected, and when an actual supercharging pressure is lower than a target supercharging pressure. According to the control, the opening timing of the exhaust valve can be advanced without changing a valve overlap period that has a large influence on combustion, and therefore, a responsiveness of a supercharging pressure can be enhanced while a combustion state is restrained from varying.

The supercharging pressure increasing control by the control device may be executed, when the target operation point moves in the lean region in accordance with an increase in a target torque, when the target supercharging pressure increases, and when the actual supercharging pressure deviates from the target supercharging pressure. According to this, in a case where the target torque increases in the lean region in which energy of an exhaust gas is small, the supercharging pressure can be raised so as to be able to achieve the target torque early.

Further, the supercharging pressure increasing control by the control device may be executed, when the target operation point moves to the lean region from a low load stoichiometric region where an operation with the theoretical air-fuel ratio is selected in accordance with an increase in the target torque, when the target supercharging pressure increases, and when the actual supercharging pressure deviates from the target supercharging pressure. According to this, in a case of shifting from an operation in the low load stoichiometric region to an operation in the lean supercharging region by an acceleration request by a driver, the supercharging pressure can be raised so as to be able to achieve the target torque early.

However, an in-cylinder air-fuel ratio may be kept at the theoretical air-fuel ratio until the actual supercharging pressure reaches the target supercharging pressure, when rapid acceleration is requested. According to this, when the acceleration request by the driver is a rapid acceleration request, the responsiveness of the supercharging pressure can be enhanced more.

Further, the supercharging pressure increasing control by the control device may be executed, when the target operation point moves to the lean region from a high load stoichiometric region in which the operation with the theoretical air-fuel ratio is selected in accordance with a decrease in the target torque, when the target supercharging pressure increases, and when the actual supercharging pressure deviates from the target supercharging pressure. According to this, in s case of shifting from an operation in the high load stoichiometric region to the operation in the lean supercharging region by a deceleration request by the driver, torque of the engine can be reduced while the supercharging pressure is quickly raised.

The control device may execute ignition timing retardation control, if the control device executes the supercharging pressure increasing control before switching the in-cylinder air-fuel ratio from the theoretical air-fuel ratio to the lean air-fuel ratio. The ignition timing retardation control is control that retards an ignition timing in accordance with an increase in the supercharging pressure until the in-cylinder air-fuel ratio is switched to the lean air-fuel ratio, and the control device decreases a retardation amount by an increase amount of exhaust pump loss in accordance with advancement of the opening timing of the exhaust valve. According to this control, a torque variation at the time of the in-cylinder air-fuel ratio being switched from the theoretical air-fuel ratio to the lean air-fuel ratio can be restrained.

If a NOx catalyst is provided in an exhaust passage of the lean-burn engine, selection of the air-fuel ratio may be performed in accordance with a temperature of the NOx catalyst. This is because when the NOx catalyst has an excessively high temperature, NOx purification performance thereof is reduced, and NOx cannot be purified. More specifically, the in-cylinder air-fuel ratio may be set in the theoretical air-fuel ratio, when the temperature of the NOx catalyst is higher than a predetermined temperature.

Advantageous Effects of Invention

According to the lean-burn engine according to the present application, the opening timing of the exhaust valve can be advanced without changing the valve overlap period which has a large influence on combustion, and therefore, the responsiveness of the supercharging pressure can be enhanced while the combustion state is restrained from varying.

DESCRIPTION OF EMBODIMENT

Hereinafter, an embodiment of the present application will be described with reference to the drawings. Note that when the numerals of the numbers, the quantities, the amounts, the ranges and the like of the respective elements are mentioned in the embodiment shown as follows, the present application is not limited to the mentioned numerals unless specially explicitly described otherwise, or unless the application is explicitly specified by the numerals theoretically. Further, structures, steps and the like that are described in the embodiment shown as follows are not always indispensable to the present application unless specially explicitly shown otherwise, or unless the application is explicitly specified by them theoretically.

1. Configuration of Engine System 1-1. Configuration of Entire System

Figure 1:
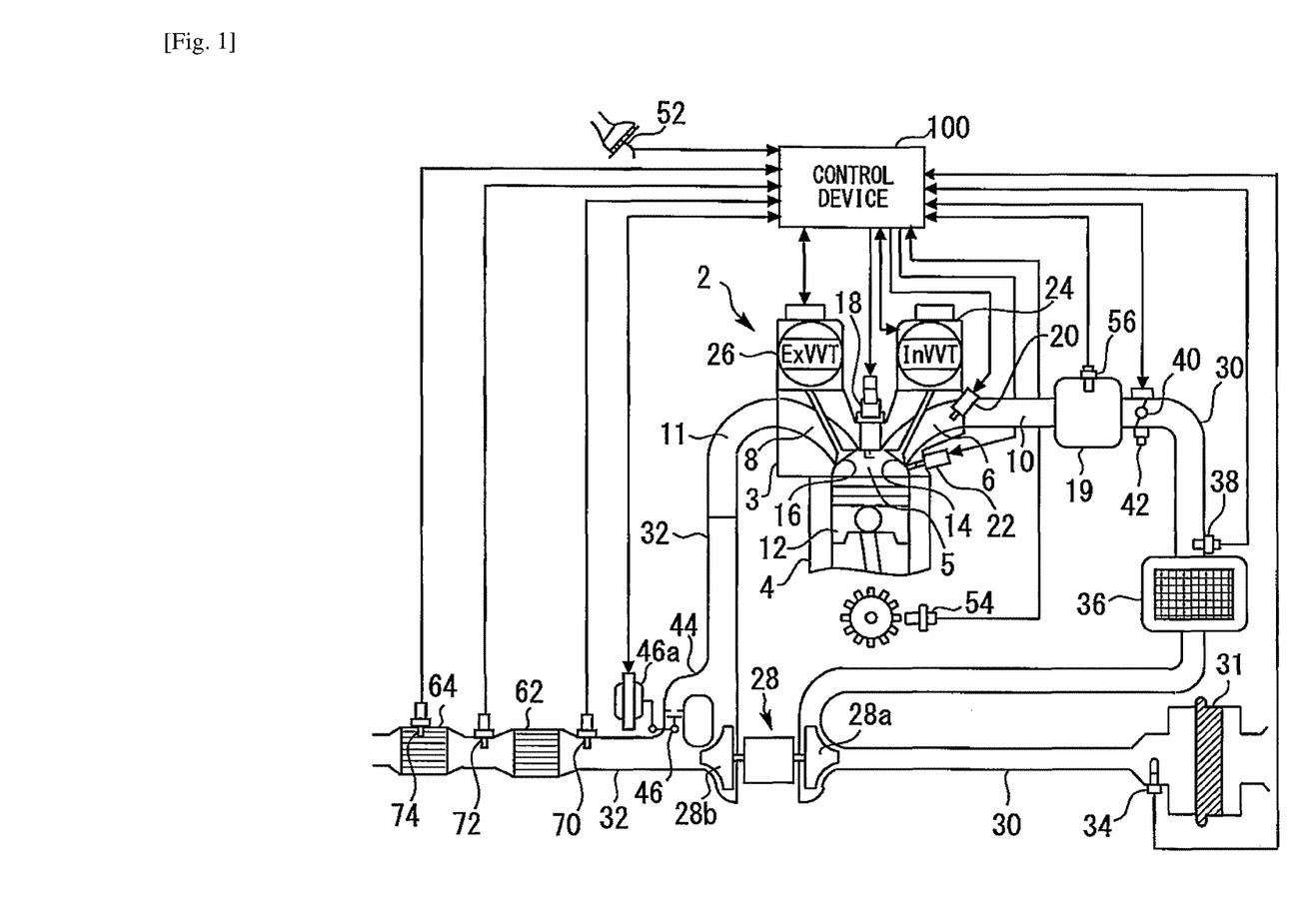
FIG. 1 is a diagram showing a configuration of an engine system of an embodiment of the present application.

FIG. 1 is a diagram showing a configuration of an engine system of the embodiment of the present application. The engine system of the present embodiment includes an internal combustion engine (hereinafter described as an engine) 2 equipped with a turbocharger, that is loaded on an automobile as a power plant. The engine 2 is a lean-burn engine capable of selecting a stoichiometric operation (that is, an operation with a theoretical air-fuel ratio) and a lean operation (that is, an operation with a predetermined lean air-fuel ratio that is leaner than the theoretical air-fuel ratio). At a time of the lean operation, an air-fuel ratio is set in an air-fuel ratio region that is leaner than an air-fuel ratio region where a large amount of NOx is generated. For example, at the time of the lean operation, a value of the air-fuel ratio is set to approximately 24.

The engine 2 includes a cylinder block 4 in which a piston 12 is disposed and a cylinder head 3. The number of cylinders and cylinder disposition of the engine 2 are not specially limited. A space sandwiched by the cylinder head 3 and the piston 12 is a combustion chamber 5. The engine 2 is a spark-ignition type engine, and an ignition plug 18 of an ignition device is mounted to the cylinder head 3 to protrude into a top portion of the combustion chamber 5.

The combustion chamber 5 communicates with an intake port 6 and an exhaust port 8. A communication state of the combustion chamber 5 and the intake port 6 is controlled by an intake valve 14 that is provided in the cylinder head 3. A communication state of the combustion chamber 5 and the exhaust port 8 is controlled by an exhaust valve 16 that is provided in the cylinder head 3. The intake valve 14 is provided with a variable intake valve mechanism 24 that makes a valve timing variable. The exhaust valve 16 is provided with a variable exhaust valve mechanism 26 that makes a valve timing and a working angle variable. In the mechanism which makes the valve timing variable, a known mechanism that changes a phase of a camshaft to a crankshaft can be used. The mechanism that makes the working angle variable will be described later.

The engine 2 includes two fuel injection valves in each cylinder. One is an in-cylinder injection valve 22 that directly injects fuel into the combustion chamber 5, and the other is a port injection valve 20 that injects the fuel into the intake port 6.

An intake manifold 10 with which a surge tank 19 is integrated is connected to the intake port 6. An intake passage 30 that takes air from an outside is connected to the surge tank 19. An electronically controlled throttle 40 is provided in a vicinity of the surge tank 19 in the intake passage 30. An air cleaner 31 is provided at a tip end of the intake passage 30.

An exhaust manifold 11 is connected to the exhaust port 8. An exhaust passage 32 that discharges an exhaust gas to the outside is connected to the exhaust manifold 11. In the exhaust passage 32, a three-way catalyst 62, and a NOx catalyst (a NOx storage reduction catalyst) 64 are provided.

The engine 2 has a turbocharger 28. A compressor 28a of the turbocharger 28 is provided on an upstream side of the throttle 40 in the intake passage 30. An intercooler 36 that cools intake air that is compressed by the compressor 28a is provided between the compressor 28a and the throttle 40 in the intake passage 30. A turbine 28b of the turbocharger 28 is provided on an upstream side of the three-way catalyst 62 in the exhaust passage 32. In a vicinity of the turbine 28b, a bypass passage 44 that bypasses the turbine 28b and connects an upstream side and a downstream side of the turbine 28b is provided. In the bypass passage 44, a wastegate valve 46 is installed. The wastegate valve 46 is driven by a diaphragm type negative pressure actuator 46a.

The system of the present embodiment includes sensors for obtaining information concerning an operation state of the engine 2 in respective spots. An air flow meter 34 for measuring an intake air amount is installed directly downstream of the air cleaner 31 in the intake passage 30. A pressure sensor 38 for measuring a supercharging pressure is installed directly downstream of the intercooler 36 in the intake passage 30. A throttle position sensor 42 for measuring an opening degree of the throttle 40 is installed in a vicinity of the throttle 40. In the surge tank 19, a pressure sensor 56 for measuring an intake pipe pressure is installed. In the present description, a pressure on the upstream side of the throttle 40 will be referred to as the supercharging pressure, and a pressure on a downstream side of the throttle 40 will be referred to as an intake manifold pressure.

An air-fuel ratio sensor 70, that outputs a signal which linearly changes with respect to the air-fuel ratio of the exhaust gas before combustion, is installed directly upstream of the three-way catalyst 62 in the exhaust passage 32. Further, an oxygen sensor 72, that outputs a signal which changes stepwise at a boundary between an excessive oxygen side and an insufficient oxygen side, is installed directly downstream of the three-way catalyst 62 in the exhaust passage 32, wherein the boundary is an oxygen concentration of the exhaust gas, and wherein the oxygen concentration is obtained by combustion of a mixture gas with the theoretical air-fuel ratio as a boundary. In the NOx catalyst 64, a temperature sensor 74 for measuring a temperature thereof (in more detail, a floor temperature) is installed.

Further, the system of the present embodiment has an accelerator position sensor 52 for measuring an opening degree of an accelerator pedal, and a crank angle sensor 54 for measuring a crank angle of the engine 2. In addition to these sensors, various sensors not illustrated are provided in the engine system.

The aforementioned various sensors and actuators are electrically connected to a control device 100. The control device 100 is an ECU (Electronic Control Unit). The control device 100 performs control of the entire system of the engine 2, and is configured mainly by a computer including a CPU, a ROM, and a RAM. The ROM stores various control programs. The control programs are executed by the control device 100, the actuators are operated based on signals from the sensors, whereby the operation of the engine 2 is controlled.

1-2. Configuration of Variable Exhaust Valve Mechanism

The variable exhaust valve mechanism 26 is configured to perform switching of the working angle of the exhaust valve 16 by switching two exhaust cams (not illustrated) having different cam profiles. The two exhaust cams drive the exhaust valve 16 and can be switched. An angle of a lift start position of one of the two exhaust cams with respect to a reference position of the camshaft is different from an angle of a lift start position of the other of the two exhaust cams with respect to the reference position of the camshaft, wherein the lift start position is a position of a contact point of each exhaust cam when a lift of the exhaust valve 16 starts. An angle of a lift end position of the one of the two exhaust cams with respect to the reference position of the camshaft and an angle of a lift end position of the other of the two exhaust cams with respect to the reference position of the camshaft are the same, wherein the lift end position is a position of the contact point of each exhaust cam when the lift of the exhaust valve 16 finishes. By a configuration like this, when the two exhaust cams are switched, an opening timing of the exhaust valve 16 changes, but a closing timing of the exhaust valve 16 does not change.

Figure 2:
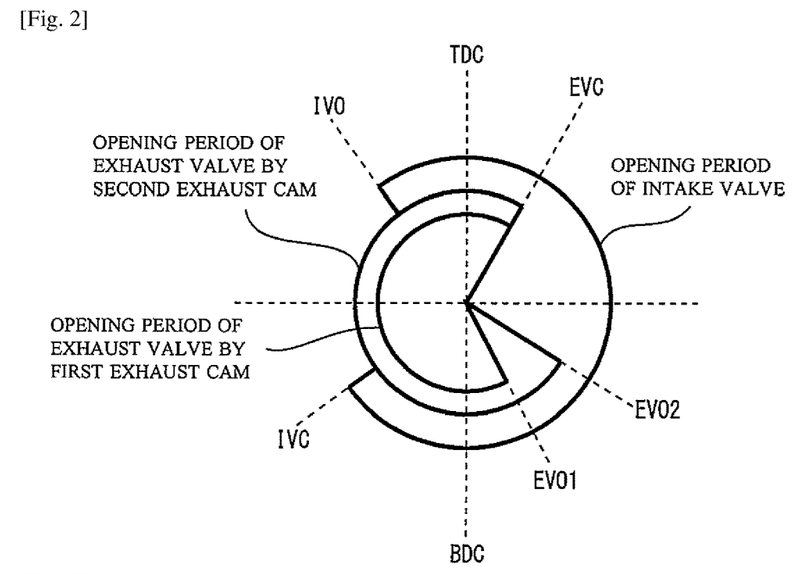
FIG. 2 is a diagram showing a valve timing by a cam of the embodiment of the present application.

FIG. 2 is a diagram showing the valve timing of the intake valve 14 that is realized by an intake cam and the valve timing of the exhaust valve 16 that is realized by the exhaust cams in combination. In FIG. 2, an angle denoted by "IVO" is an opening timing of the intake valve 14, and an angle denoted by "IVC" is a closing timing of the intake valve 14. An angle range from IVO to IVC is a working angle of the intake valve 14.

The two switchable exhaust cams that drive the exhaust valve 16 are referred to as a first exhaust cam and a second exhaust cam respectively. In FIG. 2, an angle denoted by "EVO1" refers to the opening timing of the exhaust valve 16 by the first exhaust cam, and an angle denoted by "EVO2" refers to the opening timing of the exhaust valve 16 by the second exhaust cam. An angle denoted by "EVC" refers to the closing timing of the exhaust valve 16 common to the first exhaust cam and the second exhaust cam. A relatively narrow angle range from EVO1 to EVC is the working angle of the exhaust valve 16 by the first exhaust cam, and a relatively large angle range from EVO2 to EVC is the working angle of the exhaust valve 16 by the second exhaust cam.

The first exhaust cam is normally used, and switching to the second exhaust cam is performed in accordance with necessity. Switching from the first exhaust cam to the second exhaust cam is performed, whereby only the opening timing is advanced from "EVO1" to "EVO2" while the closing timing of the exhaust valve 16 is fixed to "EVC". Since "EVO1" is set at an advance side of BDC, earlier opening of the exhaust valve 16 is realized by switching to the second exhaust cam.

An operation by advancing the opening timing of the exhaust valve 16 will be described with use of respective graphs in FIG. 3 to FIG. 8. EVO in a horizontal axis of each of the graphs means the opening timing of the exhaust valve 16, and a unit thereof is an advance degree (BBDC) from BDC. The respective graphs are results of examining an influence of EVO on state quantities after parameters such as a throttle opening degree, a wastegate valve opening degree, the intake valve opening timing and closing timing, and the exhaust valve closing timing are fixed.

Figure 3:
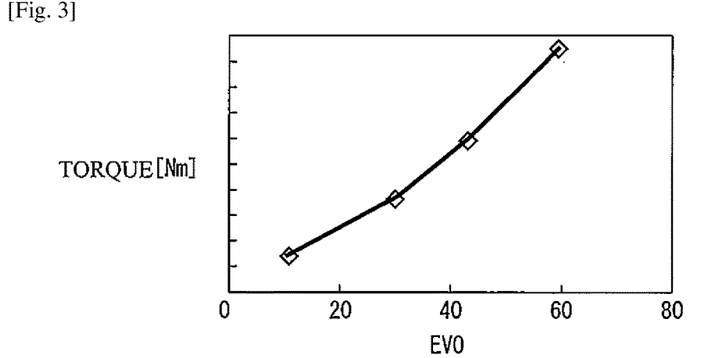
FIG. 3 is a diagram showing a relation between an opening timing of an exhaust valve and a torque.
Figure 5:
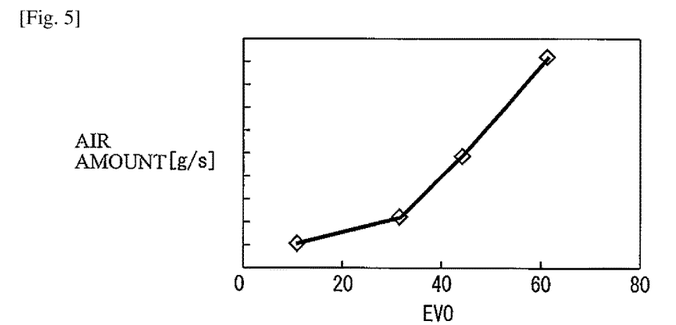
FIG. 5 is a diagram showing a relation between the opening timing of the exhaust valve and an air amount.
Figure 6:
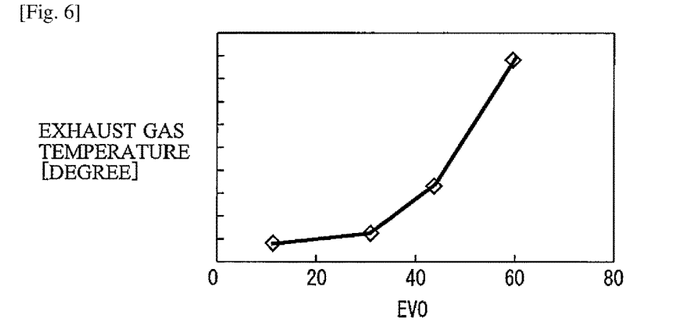
FIG. 6 is a diagram showing a relation between the opening timing of the exhaust valve and an exhaust gas temperature.
Figure 7:
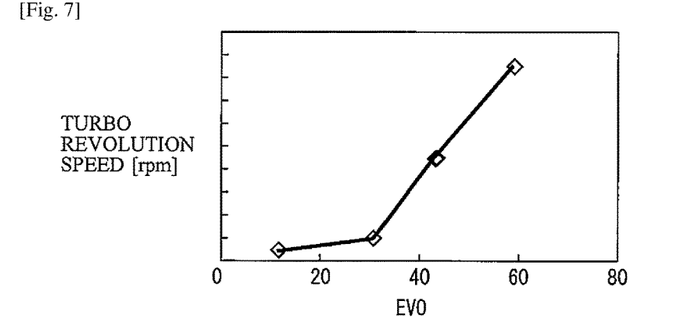
FIG. 7 is a diagram showing a relation between the opening timing of the exhaust valve and turbo revolution speed.
Figure 8:
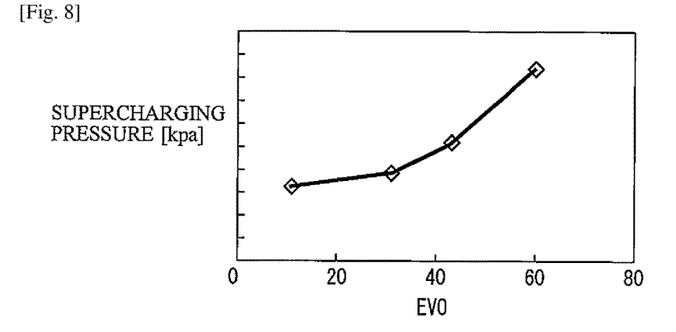
FIG. 8 is a diagram showing a relation between the opening timing of the exhaust valve and a supercharging pressure.

As shown in FIG. 3, torque increases as the EVO is advanced. This can be explained as follows. First, as shown in FIG. 6, as the EVO is advanced, an exhaust gas temperature increases. This is because as the exhaust valve is opened earlier than the BDC, thermal energy that is given to the exhaust gas increases. A rise in the exhaust temperature increases a turbine work of the turbocharger. Consequently, as shown in FIG. 7, as the EVO is advanced, turbo revolution speed increases. When the turbo revolution speed increases, the supercharging pressure by the compressor increases. Consequently, as shown in FIG. 8, as the EVO is advanced, the supercharging pressure increases. As the supercharging pressure increases, an air amount which is taken into the cylinder is increased. Thereby, as the EVO is advanced, the air amount increases as shown in FIG. 5, and as a result, a relation between the EVO and the torque as shown in FIG. 3 is obtained.

Figure 4:
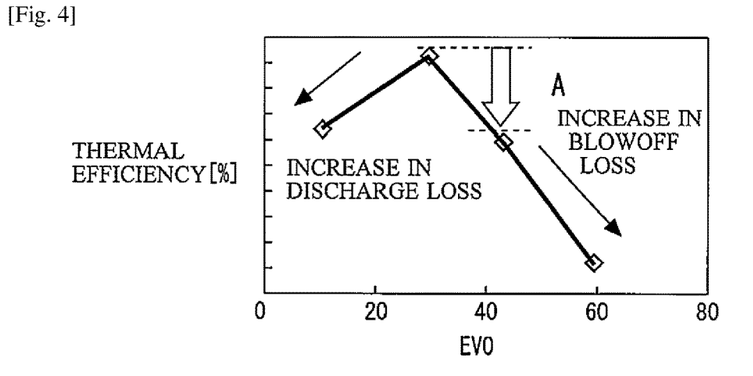
FIG. 4 is a diagram showing a relation between the opening timing of the exhaust valve and thermal efficiency.

Meanwhile, as shown in FIG. 4, in the EVO, an angle where the thermal efficiency becomes maximum is present (in the example in FIG. 4, 30 degrees BBDC). As the EVO is retarded from the angle at which the thermal efficiency becomes maximum, the thermal efficiency is reduced by an increase in discharge loss. Conversely, as the EVO is advanced from the angle at which the thermal efficiency becomes maximum, the thermal efficiency is reduced by an increase in blowoff loss. That is to say, as the EVO is advanced, the turbo work is increased to promote an increase in the supercharging pressure, but on the other hand, the thermal efficiency is reduced to reduce fuel efficiency. An arrow A shown in FIG. 4 represents an allowable reduction amount of the thermal efficiency.

The opening timing (EVO1) of the exhaust valve 16 by the first exhaust cam is set at an angle at which the thermal efficiency becomes maximum in FIG. 4. The opening timing (EVO2) of the exhaust valve 16 by the second exhaust cam is set at an angle at which the opening timing is advanced most within a range of an allowable thermal efficiency. Consequently, by setting the first exhaust cam to be normally used, high fuel efficiency performance can be obtained. By switching from the first exhaust cam to the second exhaust cam in accordance with necessity, the turbo work is increased to be able to raise the supercharging pressure quickly while reduction in fuel efficiency performance is kept within an allowable range.

Next, an operation by making the closing timing of the exhaust valve 16 constant before and after switching from the first exhaust cam to the second exhaust cam will be described. FIG. 2 shows a state in which an opening period of the exhaust valve 16 and an opening period of the intake valve 14 overlap each other. An angle range from IVO to EVC corresponds to a valve overlap period of the exhaust valve 16 and the intake valve 14.

According to the variable exhaust valve mechanism 26, EVC is common to the first exhaust cam and the second exhaust cam, and therefore, at a time of switching from the first exhaust cam to the second exhaust cam, no change occurs to the valve overlap period. That is to say, the opening timing of the exhaust valve 16 can be advanced while the valve overlap period is kept constant. Since a valve overlap period is a parameter that influences an intake air amount and an EGR rate, a combustion state is kept constant by keeping the valve overlap period constant (as shown in FIG. 2). An effect thereof is exhibited especially when combustion with the lean air-fuel ratio is performed. This is because the combustion with the lean air-fuel ratio is lower in robustness as compared with combustion with the theoretical air-fuel ratio. In short, according to the variable exhaust valve mechanism 26, the opening timing of the exhaust valve 16 can be advanced without changing the valve overlap period which significantly influences combustion, and therefore, a responsiveness of the supercharging pressure can be enhanced while the combustion state is restrained from varying especially in a case where the combustion with the lean air-fuel ratio is performed.

2. Operation of Engine System 2-1. Setting of Engine Operation Regions

Figure 9:
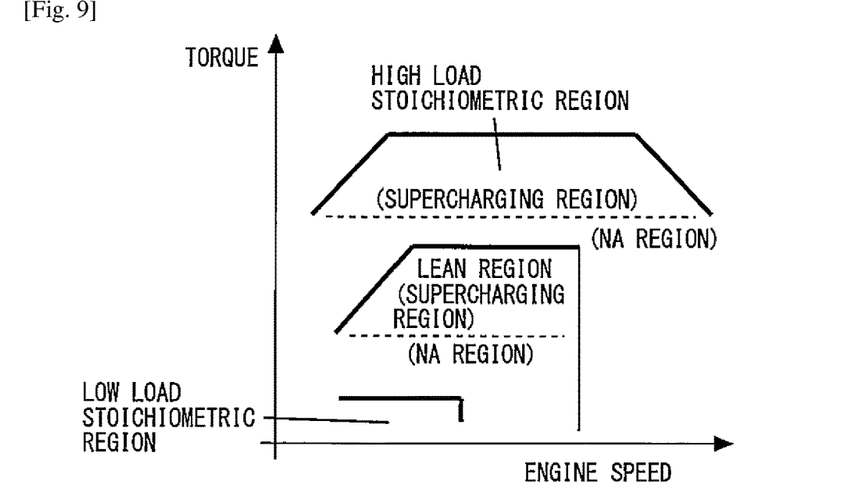
FIG. 9 is a diagram showing setting of operation regions of an engine.

FIG. 9 is a diagram showing setting of operation regions of the engine 2. An operation of the engine 2 is performed in accordance with the operation regions which are set on a two-dimensional plane with the torque and the engine speed as axes. In FIG. 9, a low load stoichiometric region, a lean region and a high load stoichiometric region are set as the operation regions of the engine. The lean region and the high load stoichiometric region are each divided into a natural aspiration region (hereinafter, referred to as an NA region) and a supercharging region.

The lean region is an operation region in which an operation with the lean air-fuel ratio is enabled, and is set to be as large as possible in order to enhance fuel efficiency performance. The lean region is divided into the natural aspiration region (hereinafter referred to as the NA region) and the supercharging region. The NA region is a region in which supercharging by the turbocharger 28 is not performed, and the supercharging region is a region in which the supercharging by the turbocharger 28 is performed. Whether the supercharging is performed or not can be determined based on whether the supercharging pressure becomes larger than an atmospheric pressure. In the lean region, the operation with the lean air-fuel ratio is performed by port injection with which a mixture gas with high homogeneity is obtained, or a combination of the port injection and in-cylinder injection with the port injection as main injection. However, at a time of execution of rich spike, at a time of rapid acceleration and the like, an operation with the theoretical air-fuel ratio or a rich air-fuel ratio that is richer than the theoretical air-fuel ratio is sometimes performed even in the lean region.

An operation region in which the operation with the lean air-fuel ratio cannot be performed or it is difficult to perform the operation with the lean air-fuel ratio, is set as the low load stoichiometric region or the high load stoichiometric region. The low load stoichiometric region is a region in which the combustion with the lean air-fuel ratio becomes unstable. In the low load stoichiometric region, the stoichiometric operation by the port injection is performed. The low load stoichiometric region is the NA region.

The high load stoichiometric region is a region in which a desired output cannot be obtained by the operation with the lean air-fuel ratio. The high load stoichiometric region is divided into the NA region and the supercharging region. In the high load stoichiometric region, the stoichiometric operation by the in-cylinder injection, or the stoichiometric operation by a combination of the port injection and the in-cylinder injection with the in-cylinder injection as main injection is performed.

A target engine output is determined from an accelerator pedal opening degree. A target torque and a target engine speed are determined from the target engine output. An operation point that is determined by the target torque and the target engine speed is a target operation point of the engine 2. A control content of the engine 2 is determined based on which operation region the target operation point is located in, and by what route the target operation point moves.

2-2. Engine control by control device

Figure 10:
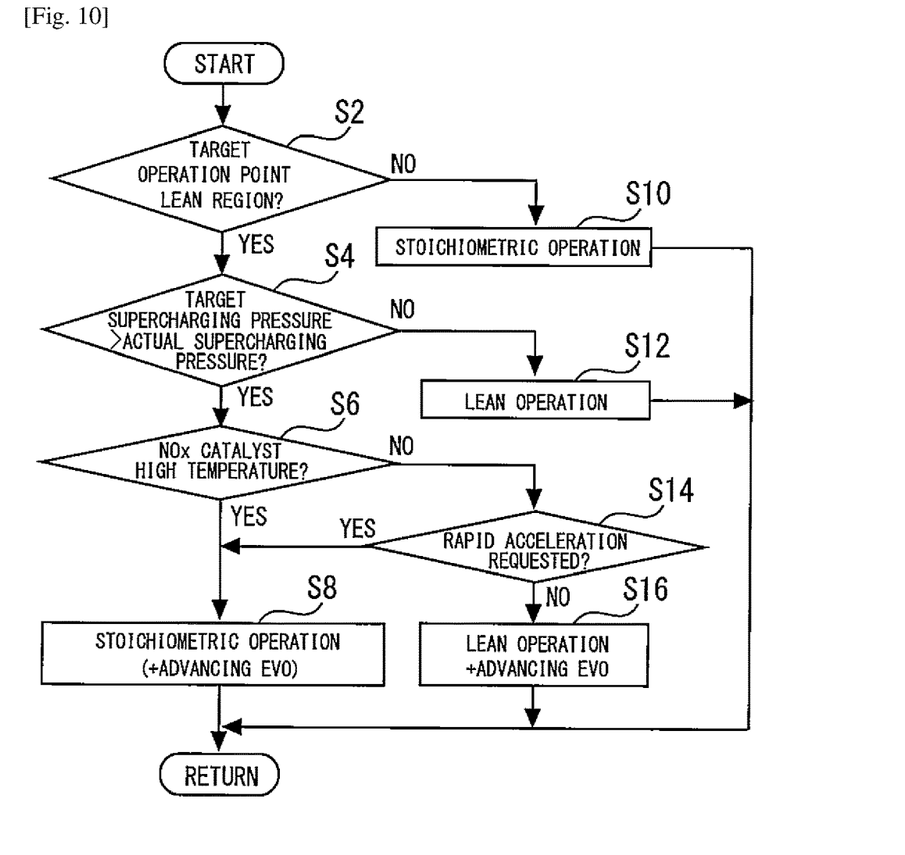
FIG. 10 is a flowchart showing a control flow of the embodiment of the present application.

FIG. 10 is a flowchart showing a flow of engine control that is performed by the control device 100. The control device 100 performs the engine control in accordance with a procedure shown in the flowchart. In step S2, it is determined whether the target operation point of the engine 2 which is fixed by the target torque and the target engine speed is in the lean region. When the target operation point is not in the lean region, a processing in step S10 is selected. In step S10, the stoichiometric operation with the theoretical air-fuel ratio is performed.

When the target operation point is in the lean region, determination in step S4 is performed next. In step S4, a target supercharging pressure and an actual supercharging pressure are compared. The target supercharging pressure is determined based on the target torque and the target engine speed with reference to a map that is stored in the ROM. The control device 100 includes a map for determining a target value of a control amount and an operation amount for each of the operation regions. The actual supercharging pressure is measured by the pressure sensor 38. When the actual supercharging pressure becomes equal to or higher than the target supercharging pressure, a processing in step S12 is selected. In step S12, the lean operation with the predetermined lean air-fuel ratio is performed.

When the actual supercharging pressure is lower than the target supercharging pressure, control for increasing the actual supercharging pressure to the target supercharging pressure is performed. In order to select a content of the control, determination in step S6 is performed first. In step S6, it is determined whether the temperature of the NOx catalyst 64 which is measured by the temperature sensor 74 is higher than an upper limit temperature of a window. The window is set in a temperature range in which purification performance of the NOx catalyst 64 is ensured. A content of a next processing changes depending on whether the NOx catalyst 64 has a high temperature exceeding the upper limit temperature.

When the NOx catalyst 64 does not have the high temperature, determination in step S14 is performed next. In step S14, it is determined whether the rapid acceleration is requested by a driver. A magnitude of acceleration that is requested by the driver is determined from an acceleration of the accelerator pedal opening degree, for example. Further, a request of the rapid acceleration may be determined from an increasing speed of the target torque. When the rapid acceleration is not requested (for example, when the acceleration of the accelerator pedal opening degree is equal to or smaller than a threshold value), a processing in step S16 is selected. When the rapid acceleration is requested, a processing in step S8 is selected.

When the processing in step S16 is selected, the lean operation with the predetermined lean air-fuel ratio is performed. Subsequently, supercharging pressure increasing control that raises the supercharging pressure by advancing the opening timing of the exhaust valve 16 is executed. Advancement of the opening timing of the exhaust valve 16 is achieved by switching from the first exhaust cam to the second exhaust cam, and therefore, the closing timing of the exhaust valve 16 is constant.

When the processing in step S8 is selected, the stoichiometric operation with the theoretical air-fuel ratio is performed although the target operation point is in the lean region. According to the stoichiometric operation, larger exhaust energy can be obtained than in the lean operation, and therefore, the turbo work is increased and the supercharging pressure can be raised. Further, switching from the first exhaust cam to the second exhaust cam is performed in accordance with necessity, and the supercharging pressure increasing control that raises the supercharging pressure by advancement of the opening timing of the exhaust valve 16 is executed in combination.

The processing in step S8 is also selected when the NOx catalyst 64 has the high temperature. When the NOx catalyst 64 has the high temperature, sufficient NOx purification performance cannot be obtained. In the case like this, the stoichiometric operation capable of purifying the exhaust gas by the three-way catalyst 62 is selected instead of the lean operation which requires the NOx catalyst 64, whereby degradation of exhaust gas performance can be prevented.

Figure 11:
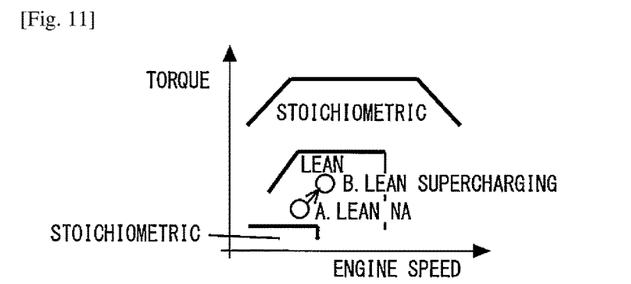
FIG. 11 is a diagram showing movement of a target operation point from a lean NA region to a lean supercharging region by an acceleration request.

3. Operation of Engine System 3-1. Operation in Case of Shifting from Lean NA Region to Lean Supercharging Region by Acceleration First, as shown in FIG. 11, an operation will be described, wherein the operation is executed, if an acceleration request (not a rapid acceleration request) occurs when the target operation point of the engine 2 is in a lean NA region, if the target torque increases in accordance with the acceleration request, and if the target operation point moves from the lean NA region to a lean supercharging region, in accordance with an increase in the target torque. This example corresponds to a case of the processing in step S16 being selected in a control flow shown in FIG. 10.

Figure 12:
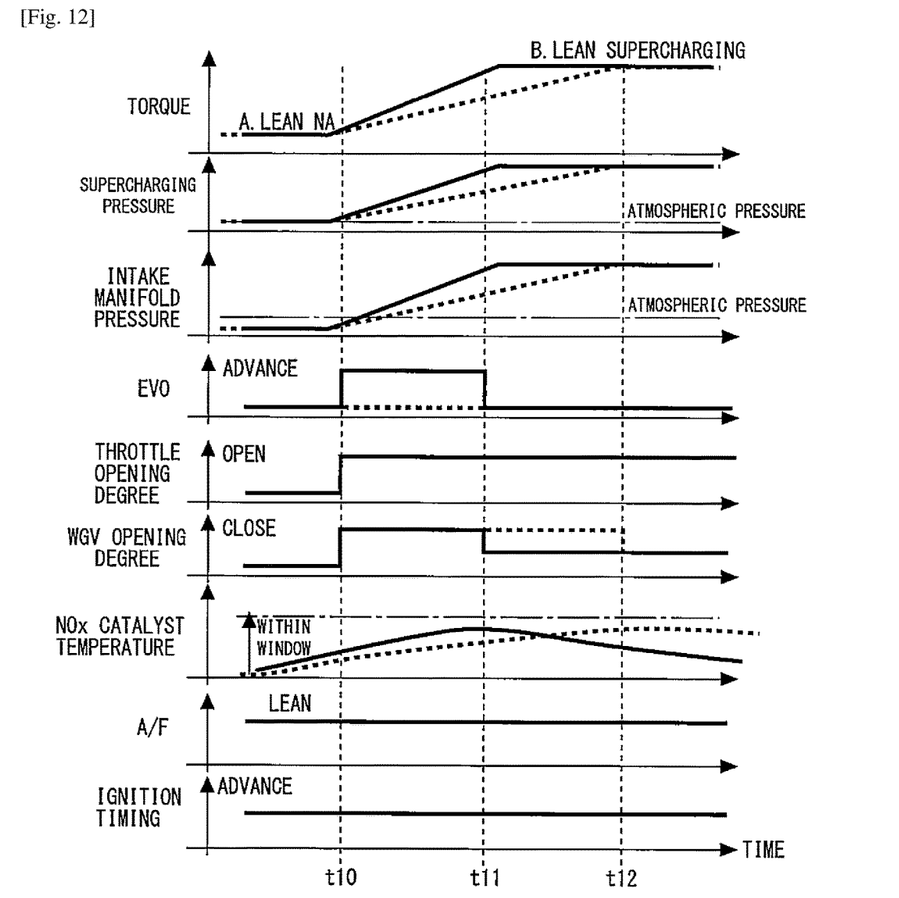
FIG. 12 is a time chart showing an operation in a case of shifting from the lean NA region to the lean supercharging region by acceleration.

FIG. 12 is a time chart showing an operation in the case of shifting from the lean NA region to the lean supercharging region by acceleration. In the time chart, changes over time of engine torque, the supercharging pressure, the intake manifold pressure, the exhaust valve opening timing (EVO), the throttle opening degree, the wastegate valve opening degree (WGV opening degree), NOx catalyst temperature, the in-cylinder air-fuel ratio (A/F) and an ignition timing. Further, in the time chart, operations according to the present embodiment are drawn by the solid lines, and the operations of a comparative example are drawn by dotted lines. In the comparative example, the supercharging pressure increasing control that raises the supercharging pressure by advancing the opening timing of the exhaust valve 16 is not performed.

At a time of start of the acceleration (time t10), the target operation point moves from the lean NA region to the lean supercharging region by the increase in the target torque, whereby the target supercharging pressure discretely increases from the atmospheric pressure to a value corresponding to the target torque. As a result, a deviation arises between the target supercharging pressure and the supercharging pressure (the actual supercharging pressure), and the WGV opening degree is fully closed so as to eliminate the deviation. At the same time, the throttle opening degree is fully opened to raise the intake manifold pressure at a maximum speed.

In the case of the comparative example in which the supercharging pressure increasing control is not performed, the energy which the exhaust gas has is small in the lean NA region, and therefore, even if the WGV opening degree is fully closed, the supercharging pressure does not rise quickly. As a result, even though the throttle opening degree is fully opened, rising speed of the intake manifold pressure is low, and much time is required until the torque reaches the target torque (time t12).

Meanwhile, according to the present embodiment, if the deviation arises between the target supercharging pressure and the actual supercharging pressure, the supercharging pressure increasing control is performed. The opening timing of the exhaust valve 16 is advanced by the supercharging pressure increasing control, whereby the exhaust gas temperature rises, and the supercharging pressure rises quickly by an increase in the turbo work. Subsequently, the supercharging pressure rises quickly, whereby a period until the torque reaches the target torque is shortened (time t11).

The advancement of the opening timing of the exhaust valve 16 by the supercharging pressure increasing control is continued until the supercharging pressure reaches the target supercharging pressure. After the supercharging pressure reaches the target supercharging pressure, the opening timing of the exhaust valve 16 is retarded to a normal angle by switching from the second exhaust cam to the first exhaust cam. The WGV opening degree is kept at full closure until the supercharging pressure reaches the target supercharging pressure. After the supercharging pressure reaches the target supercharging pressure, the WGV opening degree is adjusted to an opening degree corresponding to the target torque. The throttle opening degree is kept at full opening in the lean supercharging region. That is to say, in the lean supercharging region, torque control is performed by means of the WGV opening degree.

In the supercharging pressure increasing control, the closing timing of the exhaust valve 16 is kept constant, and therefore, the valve overlap period does not change. The valve overlap period which has a large influence on combustion is made constant, and thereby variation in the combustion state is restrained. The combustion state is stabilized, whereby the in-cylinder air-fuel ratio and the ignition timing can be kept constant from the start of the acceleration to an end of the acceleration, and controllability is enhanced.

As described above, according to the present embodiment, when the target torque is increased in the lean region in which the energy of the exhaust gas is less, the supercharging pressure can be raised to be able to achieve the target torque early while the combustion state is restrained from varying. The above operation also applies to the case where the target supercharging pressure further increases due to the increase in the target torque when the target operation point is in the lean supercharging region.

Note that in the time chart, the NOx catalyst temperature is always within the window. However, according to the supercharging pressure increasing control, the exhaust gas temperature rises, and therefore, there is a possibility of the NOx catalyst temperature exceeding the upper limit of the window. When the NOx catalyst temperature exceeds the upper limit, switching from the lean operation to the stoichiometric operation is performed in accordance with the control flow shown in FIG. 10.

Figure 13:
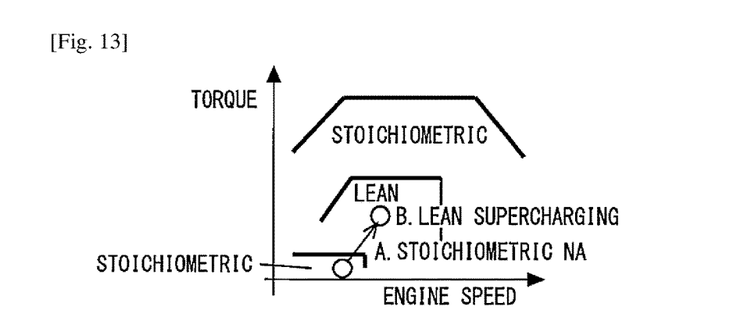
FIG. 13 is a diagram showing movement of the target operation point from a low load stoichiometric region to the lean supercharging region by the acceleration request.

3-2. Operation in Case of Shifting from Low Load Stoichiometric Region to Lean Supercharging Region by Gentle Acceleration As shown in FIG. 13, an operation will be described, wherein the operation is executed, if an acceleration request occurs when the target operation point of the engine 2 is in the low load stoichiometric region, if the target torque increases in accordance with the acceleration request, and if target operation point moves from the low load stoichiometric region to the lean supercharging region, in accordance with the increase in the target torque. At first, an example of a case where the acceleration request is not a rapid acceleration request will be described. This example corresponds to the case where the processing in step S16 is selected in the control flow shown in FIG. 10.

Figure 14:
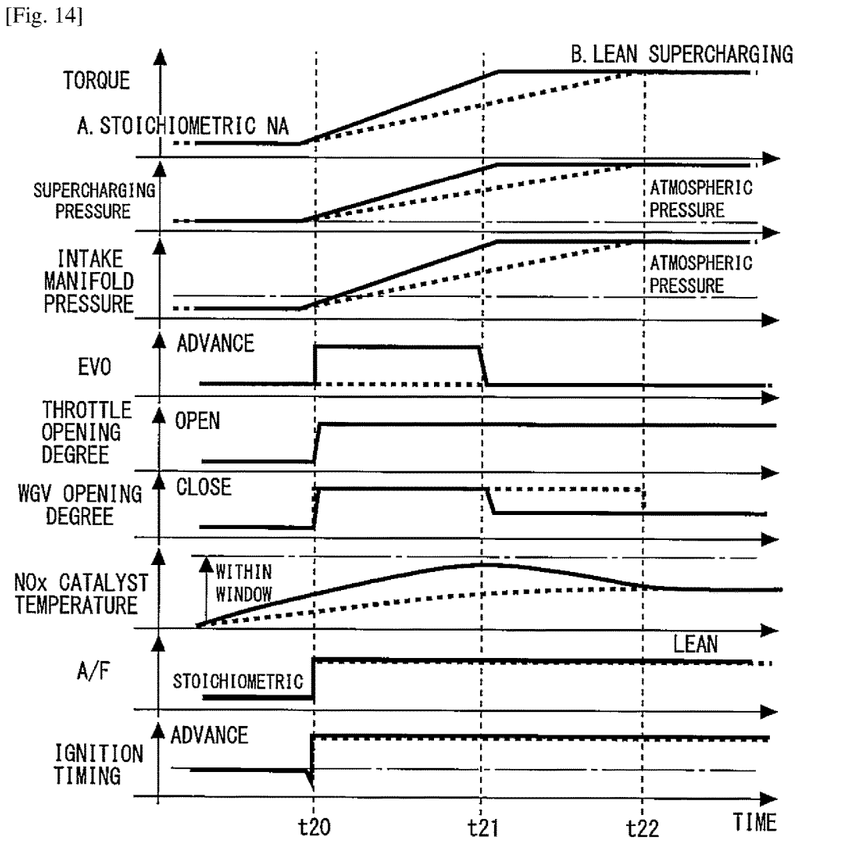
FIG. 14 is a time chart showing an operation in a case of shifting from the low load stoichiometric region to the lean supercharging region by gentle acceleration.

FIG. 14 is a time chart showing a case of shifting from the low load stoichiometric region to the lean supercharging region by gentle acceleration. Items of the time chart are the same as in FIG. 12. Further, in the time chart, the operations according to the present embodiment are drawn by solid lines, and the operations of the comparative example are drawn by dotted lines.

At a time of start of the acceleration (time t20), the in-cylinder air-fuel ratio is discretely switched from the theoretical air-fuel ratio to the predetermined lean air-fuel ratio. At the same time, the ignition timing is discretely advanced to MBT corresponding to the lean air-fuel ratio in accordance with a change in the MBT accompanying a change in the in-cylinder air-fuel ratio. Further, the target operation point shifts from the low load stoichiometric region (stoichiometric NA region) to the lean supercharging region, whereby the target supercharging pressure discretely increases from the atmospheric pressure to the value corresponding to the target torque. As a result, the deviation arises between the target supercharging pressure and the supercharging pressure, and the WGV opening degree is shifted to the full closure to eliminate the deviation. At the same time, the throttle is fully opened to raise the intake manifold pressure at the maximum speed.

Since the air-fuel ratio is switched from the theoretical air-fuel ratio to the lean air-fuel ratio, the supercharging pressure does not rise quickly even if the WGV opening degree is shifted to the full closure in the comparative example. This is because under the lean air-fuel ratio, the energy of the exhaust gas significantly decreases. Therefore, even though the throttle opening degree is at the full opening, the rising speed of the intake manifold pressure is low, and much time is required until the torque reaches the target torque (time t22).

Meanwhile, according to the present embodiment, a decrease in the energy of the exhaust gas by switching of the in-cylinder air-fuel ratio is compensated by the opening timing of the exhaust valve 16 being advanced by the supercharging pressure increasing control. Therefore, the supercharging pressure quickly rises, and the period until the torque reaches the target torque is shortened (time t21). After the supercharging pressure reaches the target supercharging pressure, the opening timing of the exhaust valve 16 is delayed to the normal angle by switching from the second exhaust cam to the first exhaust cam. Operations of the throttle opening degree and the WGV opening degree in the lean supercharging region after the supercharging pressure reaches the target supercharging pressure are as described with use of FIG. 12.

Further, from the start to the end of acceleration, the valve overlap period that has a large influence on combustion is kept constant, and therefore, variation in the combustion state is restrained. The combustion state is stabilized, whereby after the in-cylinder air-fuel ratio is switched from the theoretical air-fuel ratio to the lean air-fuel ratio, the in-cylinder air-fuel ratio and the ignition timing can be kept constant, and controllability is enhanced. Note that in this example, switching from the lean operation to the stoichiometric operation is performed in accordance with the control flow shown in FIG. 10 when the NOx catalyst temperature exceeds the upper limit of the window halfway through the shift to the lean supercharging region.

3-3. Operation in Case of Shifting from Low Load Stoichiometric Region to Lean Supercharging Region by Rapid Acceleration Next, an operation will be described, wherein the operation is executed, if a rapid acceleration request occurs when the target operation point of the engine 2 is in the low load stoichiometric region, if the target torque increases in accordance with the rapid acceleration request, and if target operation point moves from the low load stoichiometric region to the lean supercharging region, in accordance with the increase in the target torque. This example corresponds to the case where the processing in step S8 is selected in the control flow shown in FIG. 10.

Figure 15:
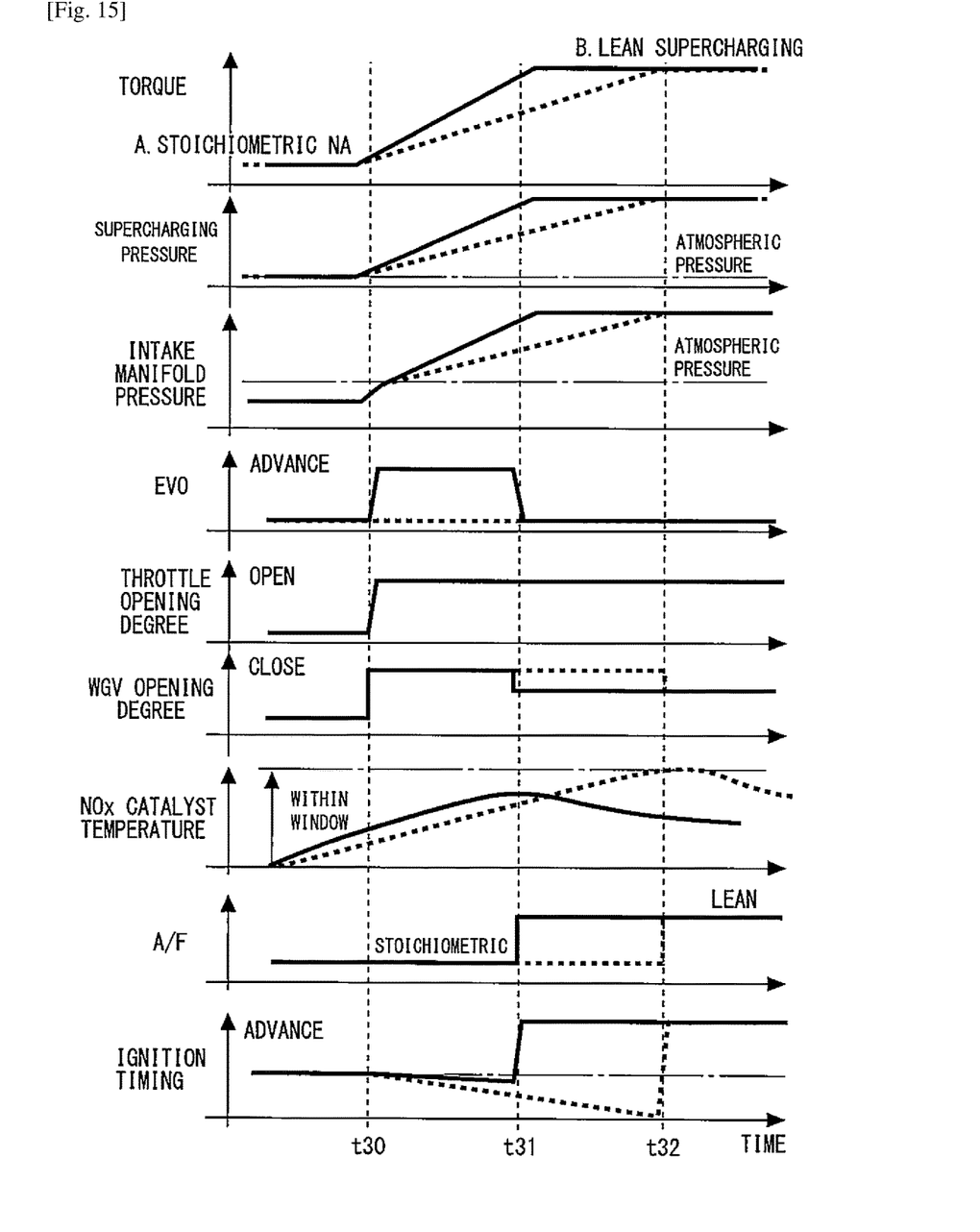
FIG. 15 is a time chart showing an operation in a case of shifting from the low load stoichiometric region to the lean supercharging region by rapid acceleration.

FIG. 15 is a time chart showing an operation in a case of shifting from the low load stoichiometric region to the lean supercharging region by rapid acceleration. Items of the time chart are the same as in FIGS. 12 and 14. Further, in the time chart, the operations according to the present embodiment are drawn by solid lines, and the operations of the comparative example are drawn by dotted lines.

In the case of the rapid acceleration, at the time of the start of the acceleration (time t30), the WGV opening degree is brought into the full closure, and the throttle opening degree is brought into the full opening. However, unlike the case of the gentle acceleration, the in-cylinder air-fuel ratio is kept at the theoretical air-fuel ratio. This is because the responsiveness of the supercharging pressure to the operations of the WGV opening degree and the throttle opening degree is more excellent in the stoichiometric operation than in the lean operation. Switching of the in-cylinder air-fuel ratio from the theoretical air-fuel ratio to the lean air-fuel ratio is performed, when the supercharging pressure rises and reaches the target supercharging pressure. Further, in order to prevent a torque level difference from occurring when the in-cylinder air-fuel ratio is switched, ignition timing retardation control that gradually retards the ignition timing in accordance with the increase in the supercharging pressure is performed in a period from the start of the acceleration until switching of the in-cylinder air-fuel ratio is performed. Subsequently, in accordance with switching of the in-cylinder air-fuel ratio, the ignition timing is discretely advanced to the MBT corresponding to the lean air-fuel ratio.

Even in the comparative example, since the WGV opening degree is brought into the full closure while the stoichiometric operation is kept, the supercharging pressure rises more quickly, as compared with the gentle acceleration which brings the WGV opening degree into the full closure after switching to the lean operation. However, according to the present embodiment, from a time of the start of the acceleration, the supercharging pressure increasing control is executed in parallel with the stoichiometric operation. The opening timing of the exhaust valve 16 is advanced by the supercharging pressure increasing control, whereby the exhaust gas temperature further rises. Thereby, the supercharging pressure rises more quickly. A time (time t31) at which the torque reaches the target torque in the present embodiment is significantly made earlier than a time (time t32) at which the torque reaches the target torque in the comparative example. After the supercharging pressure reaches the target supercharging pressure, the opening timing of the exhaust valve 16 is retarded to the normal angle by switching from the second exhaust cam to the first exhaust cam. The operations of the throttle opening degree and the WGV opening degree in the lean supercharging region after the supercharging pressure reaches the target supercharging pressure are as described with use of FIG. 12.

Further, according to the present embodiment, the opening timing of the exhaust valve 16 is advanced by the supercharging pressure increasing control, whereby exhaust pump loss increases. Therefore, a retardation amount of the ignition timing, which is required to reduce the torque, is decreased by an increase amount of the exhaust pump loss, as compared with a case where the supercharging pressure increasing control is not executed. If the retardation amount of the ignition timing at a time of the stoichiometric operation decreases, an advance amount of the ignition timing at a time of switching the in-cylinder air-fuel ratio can be decreased correspondingly. Changing the ignition timing itself is a cause of a torque variation, and therefore, if the advance amount of the ignition timing can be decreased, a possibility of the torque variation can be reduced correspondingly.

Further, since the energy which is given to the exhaust gas is large in the stoichiometric operation, the NOx catalyst temperature rises in accordance with the increase in the torque after the start of the acceleration. If a period in which the stoichiometric operation is continued is long, the NOx catalyst temperature also continues to rise correspondingly, and a fear of the NOx catalyst temperature exceeding the upper limit of the window arises. When the NOx catalyst temperature exceeds the upper limit of the window, switching to the lean operation cannot be performed even if the supercharging pressure reaches the target supercharging pressure. In this regard, according to the present embodiment, the supercharging pressure can be caused to reach the target supercharging pressure early. Therefore, the period in which the stoichiometric operation is continued can be made short, and the NOx catalyst temperature can be reduced by early switching to the lean operation.

Figure 16:
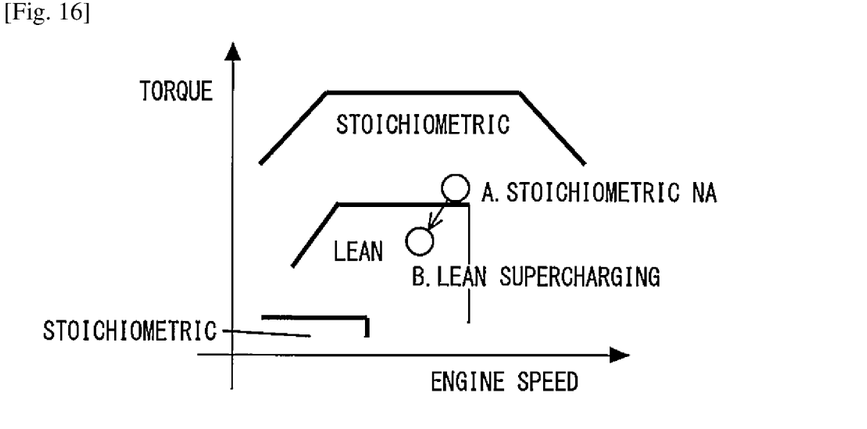
FIG. 16 is a diagram showing movement of the target operation point from a high load stoichiometric region to the lean supercharging region by a deceleration request.

3-4. Operation in Case of Shifting from High Load Stoichiometric Region to Lean Supercharging Region by Deceleration Finally, as shown in FIG. 16, an operation will be described, wherein the operation is executed, if a deceleration request occurs when the target operation point of the engine 2 is in the high load stoichiometric region, if the target torque decreases in accordance with the deceleration request, and if the target operation point moves from the high load stoichiometric region to the lean supercharging region, in accordance with a decrease in the target torque. Note that the control flow shown in FIG. 10 is the control flow which is executed when the target torque increases, and when the target torque decreases as in this example, engine control is performed in accordance with a different control flow from the control flow shown in FIG. 10. A content of the engine control according to the control flow appears in an operation that will be described as follows, and therefore, explanation of the control flow using a flowchart will be omitted.

Figure 17:
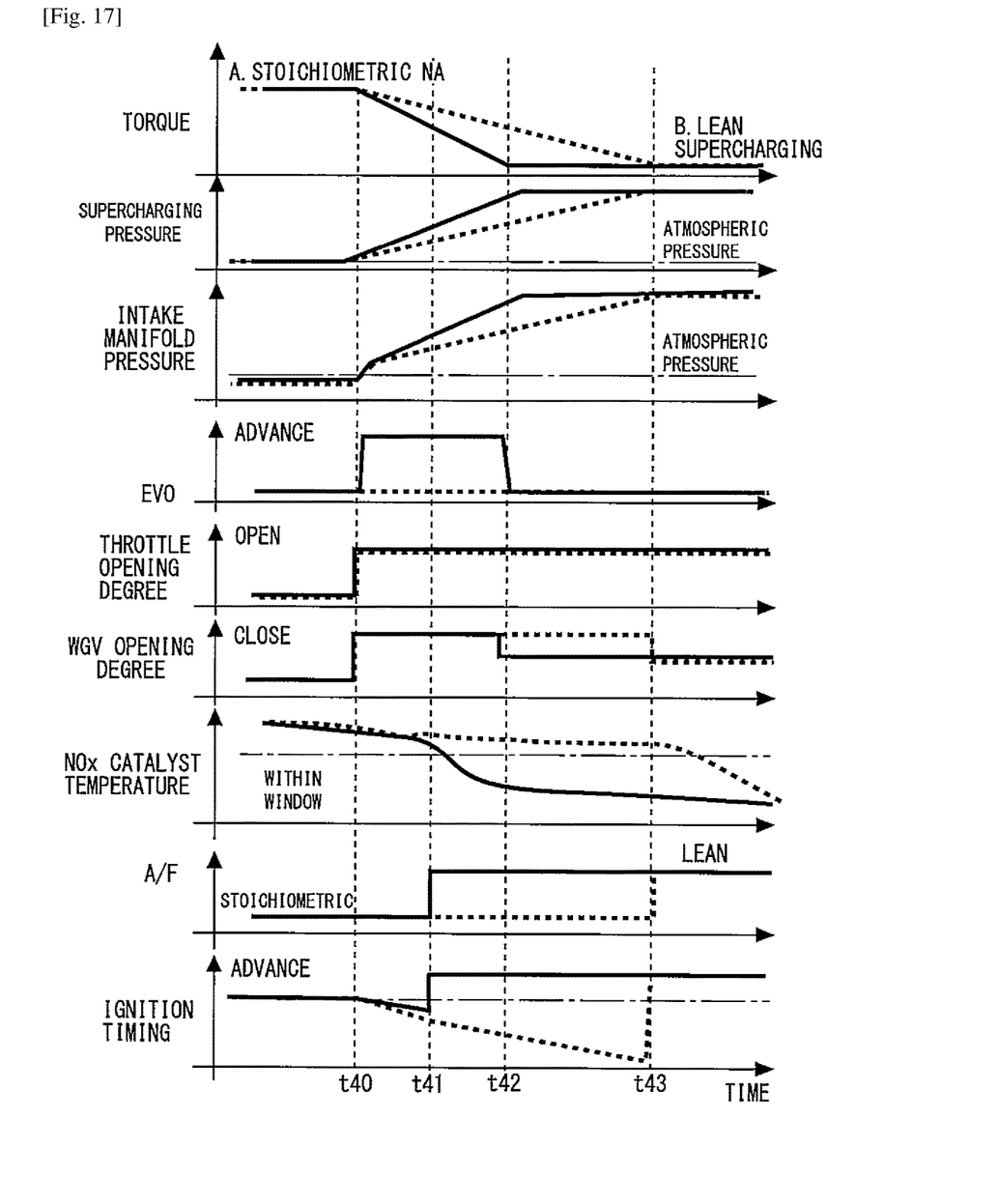
FIG. 17 is a time chart showing an operation in a case of shifting from the high load stoichiometric region to the lean supercharging region by deceleration.

FIG. 17 is a time chart showing an operation in a case of shifting from the high load stoichiometric region to the lean supercharging region by deceleration. Items of the time chart are the same as in FIGS. 12, 14 and 15. Further, in the time chart, the operations according to the present embodiment are drawn by solid lines, and the operations of the comparative example are drawn by dotted lines.

At a time of start of the deceleration (time t40), the target operation point shifts from the high load stoichiometric region to the lean supercharging region due to the decrease in the target torque, whereby the target supercharging pressure discretely increases to the value corresponding to the target torque. As a result, the deviation occurs between the target supercharging pressure and the supercharging pressure, and the WGV opening degree is brought into the full closure so as to eliminate the deviation. At the same time, in order to raise the intake manifold pressure at the maximum speed, the throttle is fully opened.

In the comparative example, since the WGV opening degree is brought into the full closure while the stoichiometric operation is kept, the increase in the supercharging pressure is also seen. However, until a time (time t43) at which the supercharging pressure reaches the target supercharging pressure, the in-cylinder air-fuel ratio cannot be switched to the lean air-fuel ratio. This is because the increase in the supercharging pressure is restrained due to the decrease in the energy of the exhaust gas by switching to the lean air-fuel ratio. Therefore, in the comparative example, switching of the in-cylinder air-fuel ratio to the lean air-fuel ratio is delayed, whereby a time at which the torque is reduced to the target torque is also delayed, and the driver cannot obtain an expected sense of the deceleration sufficiently. Note that in order to prevent the torque level difference from occurring when the in-cylinder air-fuel ratio is switched, the torque is reduced by gradually retarding the ignition timing in a period from the start of the deceleration until switching of the in-cylinder air-fuel ratio is performed. In accordance with switching of the in-cylinder air-fuel ratio, the ignition timing is discretely advanced to the MBT corresponding to the lean air-fuel ratio.

Meanwhile, according to the present embodiment, the supercharging pressure increasing control is executed in parallel with the stoichiometric operation simultaneously with the start of the deceleration. Subsequently, in a time (time t41) at which the supercharging pressure does not reach the target supercharging pressure, but rises to a certain magnitude, the in-cylinder air-fuel ratio is switched from the theoretical air-fuel ratio to the lean air-fuel ratio. The opening timing of the exhaust valve 16 is advanced by the supercharging pressure increasing control, whereby the exhaust gas temperature rises to a large extent. Therefore, even when the in-cylinder air-fuel ratio is switched to the lean air-fuel ratio, the energy of the exhaust gas which is required to raise the supercharging pressure by driving the turbocharger can be obtained.

Further, the exhaust pump loss increases by the opening timing of the exhaust valve 16 being advanced. Therefore, required retardation amount of the ignition timing is decreased by the increase amount of the exhaust pump loss, as compared with the case where the supercharging pressure increasing control is not executed. If the retardation amount of the ignition timing at the time of the stoichiometric operation decreases, the advance amount of the ignition timing at the time of switching the in-cylinder air-fuel ratio can be decreased. Changing the ignition timing itself is the cause of the torque variation, and therefore, if the advance amount of the ignition timing can be decreased, the possibility of the torque variation can be reduced correspondingly.

Note that concerning the NOx catalyst temperature, until the time t41 at which the in-cylinder air-fuel ratio is switched from the theoretical air-fuel ratio to the lean air-fuel ratio in the present embodiment, a large difference does not occurs in the change of the NOx catalyst temperature between the present embodiment and the comparative example. However, in the comparative example in which the stoichiometric operation is continued, a state in which the NOx catalyst temperature exceeds the upper limit of the window continues, whereas according to the present embodiment, switching to the lean operation is performed at the time t41, and thereby the NOx catalyst temperature is reduced to a large extent and is within the window.

Since the supercharging pressure increasing control is also continued after switching of the in-cylinder air-fuel ratio, the supercharging pressure continues to rise quickly. Thereby, a period until the supercharging pressure reaches the target supercharging pressure is shortened, and a time (time t42) at which the torque is reduced to the target torque is significantly made earlier than the time (time t43) at which the torque is reduced to the target torque in the comparative example. After the supercharging pressure reaches the target supercharging pressure, the opening timing of the exhaust valve 16 is retarded to the normal angle by switching from the second exhaust cam to the first exhaust cam. The operations of the throttle opening degree and the WGV opening degree in the lean supercharging region after the supercharging pressure reaches the target supercharging pressure are as described with used of FIG. 12.

REFERENCE SIGNS LIST

2 Engine
5 Combustion chamber
20 Port injection valve
22 In-cylinder injection valve
24 Variable intake valve mechanism
26 Variable exhaust valve mechanism
28 Turbocharger
28*a* Compressor
28*b* Turbine
30 Intake passage
32 Exhaust passage
40 Throttle
46 Wastegate valve
64 NOx catalyst
100 Control device

What is claimed is:
1. A lean-burn engine equipped with a turbocharger, comprising:
   a variable valve mechanism:
   wherein the variable valve mechanism includes at least two cams and is configured to switch said at least two cams to simultaneously change an opening timing of an exhaust valve and keep a closing timing of the exhaust valve being constant
   at least one sensor for detecting a lean-burn engine operation, and an actual supercharging pressure, and
   a control device including executable instructions stored in a non-transitory memory to execute a supercharging pressure increasing control by operating the variable valve mechanism to simultaneously advance the opening timing of the exhaust valve and keep a closing timing of the exhaust valve being constant with respect to a target lean-burn engine operation in a lean region and the actual supercharging pressure being lower than a target supercharging pressure to control an increase in supercharging pressure;

wherein the lean-burn engine operation with a lean air-fuel ratio that is leaner than a theoretical air-fuel ratio is selected in the lean region.

2. The lean-burn engine according to claim 1, wherein the control device further executes the supercharging pressure increasing control with respect to a change of the target lean-burn engine operation point in the lean region in accordance with an increase in a target torque, an increase of the target supercharging pressure, and a deviation of the actual supercharging pressure from the target supercharging pressure.

3. The lean-burn engine according to claim 1, wherein the control device further executes the supercharging pressure increasing control with respect to a change of the target lean-burn engine operation point from a low load stoichiometric region to the lean region in accordance with an increase in a target torque, an increase of the target supercharging pressure, and a deviation of the actual supercharging pressure from the target supercharging pressure; and
wherein the lean-burn engine operation with the theoretical air-fuel ratio is selected in the low load stoichiometric region.

4. The lean-burn engine according to claim 3, wherein when rapid acceleration is requested, the control device operates the variable valve mechanism of the exhaust valve to keep an in-cylinder air-fuel ratio at the theoretical air-fuel ratio until the actual supercharging pressure reaches the target supercharging pressure.

5. The lean-burn engine according to claim 4, wherein the control device further executes an ignition timing retardation in accordance with an increase or the actual supercharging until the in-cylinder air-fuel ratio is switched from the theoretical air-fuel ratio to the lean air-fuel ratio; and
wherein the control device decreases the ignition timing retardation by an increase of exhaust pump loss in accordance with advancing the opening timing of the exhaust valve.

6. The lean-burn engine according to claim 1, wherein the control device further executes the supercharging pressure increasing control with respect to a change of the target lean-burn engine operation point from a high load stoichiometric region to the lean region in accordance with a decrease in a target torque, an increase of the target supercharging pressure, and a deviation of the actual supercharging pressure from the target supercharging pressure; and
wherein the lean-burn engine operation with the theoretical air-fuel ratio is selected in the high load stoichiometric region.

7. The lean-burn engine according to claim 1, wherein the lean-burn engine comprises a NOx catalyst that is provided in an exhaust passage and a sensor for detecting a temperature of the NOx catalyst; and
wherein the in-cylinder air-fuel ratio is controlled by the control device in the theoretical air-fuel ratio with respect to the temperature of the NOx catalyst being higher than a predetermined temperature.

8. The lean-burn engine according to claim 1, wherein an angle of a lift start position of one of said at least two cams with respect to a reference position of a camshaft is different from an angle of a lift start position of another of said at least two cams with respect to the reference position of the camshaft; and
wherein an angle of a lift end position of said one of said at least two cams with respect to the reference position of the camshaft is identical to an angle of a lift end position of said another of said at least two cams with respect to the reference position of the camshaft.

* * * * *